April 7, 1925.

J. R. BARNETT

MACHINE FOR MAKING DOVETAIL SLOTS

Filed March 12, 1923

INVENTOR
J. R. Barnett
BY
ATTORNEYS

April 7, 1925.  1,532,467
J. R. BARNETT
MACHINE FOR MAKING DOVETAIL SLOTS
Filed March 12, 1923   2 Sheets-Sheet 2

INVENTOR
J. R. Barnett
BY
ATTORNEYS

Patented Apr. 7, 1925.

1,532,467

UNITED STATES PATENT OFFICE.

JOHN RICHARD BARNETT, OF CAIRO, ILLINOIS.

MACHINE FOR MAKING DOVETAIL SLOTS.

Application filed March 12, 1923. Serial No. 624,595.

*To all whom it may concern:*

Be it known that I, JOHN RICHARD BARNETT, a citizen of the United States, and a resident of Cairo, in the county of Alexander and State of Illinois, have invented a new and useful Improvement in Machines for Making Dovetail Slots, of which the following is a full, clear, and exact description.

My invention relates to improvements in machines for making dovetail slots, and it consists in the combinations, constructions, and arrangements herein described and claimed.

The ordinary Byrkett lath is provided with angularly-shaped grooves in its sides and with dovetail grooves on one of its surfaces, the grooves in the sides also forming dovetail slots when the laths are placed side by side in a wall form. The plaster, when applied flows into these grooves. When the plaster becomes hardened, the part of the plaster received in the grooves aids in holding the plaster to the wall. I have found that the ordinary matcher or molding machine can readily make a Byrkett lath with the exception of the dovetail grooves. Many of the machines for making the grooves do not make the grooves dovetail. The principal object of my invention is to provide a machine for making dovetail slots in laths which are formed by a matcher or molding machine, whereby a Byrkett lath is made by combining the two machines.

A further object of my invention is to provide a device of the type described which has novel means for making the dovetail grooves any depth desired.

A further object of my invention is to provide a device of the type described which is relatively simple in construction, and which is not likely to get out of order easily.

A further object of my invention is to provide a device of the type described which is adapted to be placed near a matcher or molding machine, whereby the laths can be readily provided with dovetail slots by merely running them through the device after they have passed through the matcher or molding machine.

Other objects and advantages will appear in the following specification, and the novel features of the invention will be particularly pointed out in the appended claim.

My invention is illustrated in the accompanying drawings forming part of this application, in which—

In carrying out my invention I provide a base 1 upon which a frame 2 is bolted. The frame 2 carries a sliding frame 3 which is adapted to be moved in a vertical plane.

Figure 3:
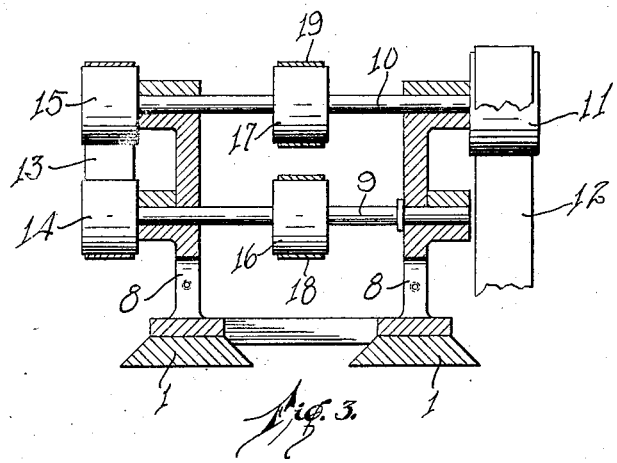
Figure 3 is a section along the line 3—3 of Figure 1.
Figure 4:
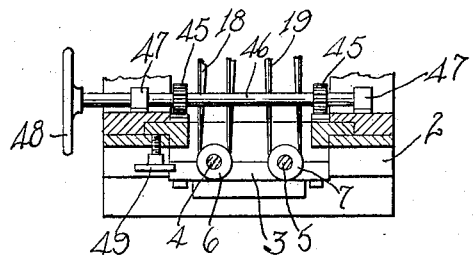
Figure 4 is a section along the line 4—4 of Figure 2.
Figure 5:
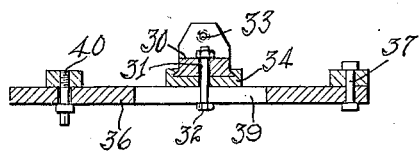
Figure 5 is a section along the line 5—5 of Figure 2.

The frame 3 carries two vertically extending spindles 4 and 5, these spindles having integral pulleys 6 and 7. A second frame 8 is secured to the base 1 and carries two horizontally disposed shafts 9 and 10. In Figure 3 I have shown the shaft 10 as being provided with a pulley 11 around which a belt 12 is disposed, the belt being actuated by a motor (not shown). The shafts 9 and 10 are operatively connected to each other by means of a belt 13 that is disposed around pulleys 14 and 15 respectively. The shafts 9 and 10 also carry pulleys 16 and 17 that are operatively connected to the pulleys 6 and 7 by means of belts 18 and 19 respectively. From this construction it will be apparent that when the shaft 10 is actuated, the vertically extending spindles 4 and 5 will be rotated.

Figure 1:
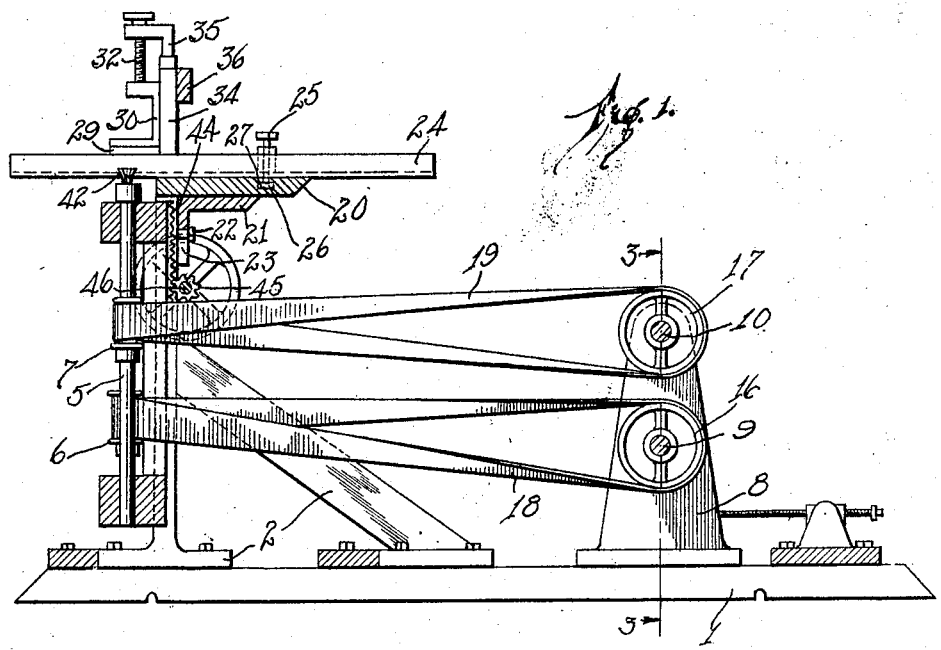
Figure 1 is a section along the line 1—1 of Figure 2.

A lath holding device 20 is adjustably carried by the frame 2 and is disposed directly above the spindles 4 and 5, (see Figure 1). The lath holding frame 20 is secured to the frame 2 by means of brackets 21 and bolts 22. The brackets 21 have slots 23 therein in which the bolts 22 are slidably disposed. This construction provides a simple means whereby the frame 20 may be adjusted vertically with respect to the frame 2.

Figure 2:
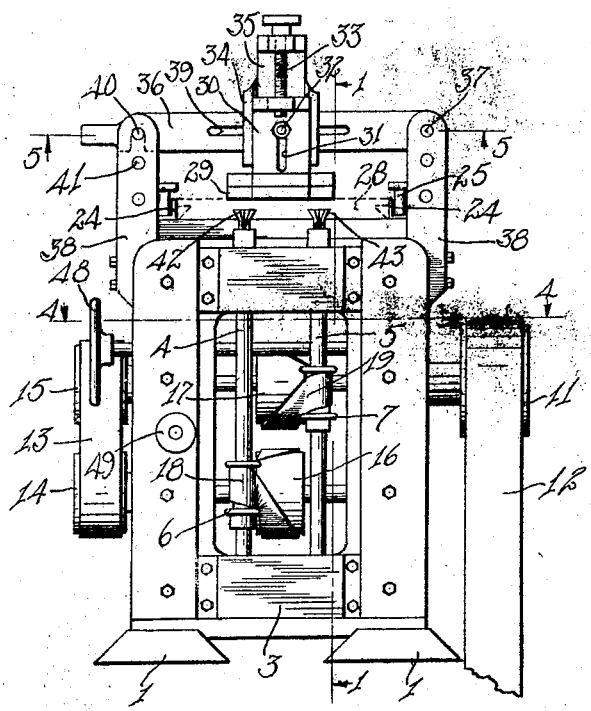
Figure 2 is a front elevation of the device.

Lath gripping angle irons 24 are carried by the frame 20 and are adjustably held in place by means of set screws 25. The set screws have heads 26, these heads being slidably received in the groove 27. The groove 27 extends at right angles with respect to the angle irons 24, whereby the angle irons are adapted to be moved toward or away from each other and be locked in place by means of the set screws 25. In Figure 2 I have shown the angle irons as bearing against the sides of the Byrkett lath 28.

The lath 28 is held against upward movement with respect to the frame 20 by means of an adjustable retaining board 29 that is carried by a vertically extending plate 30 which has a slot 31 therein. A bolt 32 is slidably received in the slot and is adapted to hold the plate 30 in adjusted position. The plate is moved in a vertical direction by means of a screw 33, the plate being guided in its movement by guides 34. The guides 34 are part of a frame 35, the frame being adjustably carried by a bar 36 that is pivoted at 37 by uprights 38 of the frame 20. The frame 35 is adapted to be moved along the bar 36 and to this end I provide a slot 39 through which the bolt 32 extends. The bolt 32 extends through the frame 30, the frame 35, and the bar 36, and is adapted to lock the retaining board 29 in place after it is once adjusted. The slots 31 and 39 permit the retaining board to be moved in a vertical or horizontal position.

The bar 36 may be swung about the pivot 37 so as to move the board 29 from the lath 28. The bar 36 is secured in position by means of a bolt 40. In the present form of the device I have shown each of the uprights 38 as being provided with a number of openings 41 therein, these openings permitting the bar 36 to be adjusted vertically with respect to the frame 20.

In some instances, the operator may desire to move the frame 3 with respect to the frame 20 so as to vary the cutting depth of the bits 42 and 43 of the spindles 4 and 5 respectively. The bits are of novel construction, and the cutting edges thereof are flared outwardly so as to make an angle of sixty degrees with the under side of the lath. The bits 42 and 43 are therefore adapted to make a dovetail slot in the under side of the lath 28 as the lath is moved past the bits. The frame 3 is provided with a plurality of teeth 44 which are engaged by pinions 45. The pinions are mounted upon a shaft 46 which is journaled in bearings 47, the bearings being carried by the frame 2. A hand wheel 48 is adapted to rotate the shaft 46, whereby the frame 3 is raised and lowered with respect to the lath 28. The frame 3 may be locked in adjusted position by means of a set screw 49.

From the foregoing description of the various parts of the device, the operation thereof may be readily understood. As heretofore stated, the device is adapted to be placed adjacent to a matcher or molding machine, whereby the Byrkett laths can be fed directly from the matcher or molding machine into the device. Before the lath is fed into the device, the retaining board 29, the frame 20, and the frame 3, are adjusted by the means heretofore described so as to correctly position the lath with respect to the cutting bits 42 and 43. The motor (not shown), rotates the shaft 10 which in turn rotates the bits 42 and 43 at a sufficient speed so as to cause the bits to cut two dovetail slots in the under side of the lath. The cutting of these slots is very quickly accomplished. It is a mere matter of moving the lath between the angle iron guides and over the cutting bits 42 and 43.

The device is relatively simple in construction, and provides a novel and efficient means for cutting dovetail grooves in laths or the like. The device is operated easily, and is not likely to get out of order. Four or more spindles can be used if desired in the device.

I claim:

A device of the type described comprising a frame having vertical guides, a spindle carrying frame slidably received in said guides, means for securing said frame in adjusted position, a work support carried by said guides, means for adjustably securing said work support on said guides, work guiding members adjustably carried by said support, uprights carried by said support, an arm having a slot therein and being pivotally and adjustably carried by one of said uprights, a pin adjustably carried by the other upright for supporting the free end of said arm, a plate, a work engaging member, a screw for moving said work engaging member with respect to said plate, and means for locking said work engaging member and plate against movement, said means also supporting said arm and work engaging members.

JOHN RICHARD BARNETT.